United States Patent Office 3,067,141
Patented Dec. 4, 1962

3,067,141
DIELECTRIC PLASTIC COMPOSITION
Norbert M. Bikales, Stamford, and Wesley O. Fugate, Old Greenwich, Conn., assignors to American Cyanamid Company, New York, N.Y., a corporation of Maine
No Drawing. Filed Nov. 7, 1960, Ser. No. 67,458
8 Claims. (Cl. 252—63.2)

The present invention is concerned with a novel composition of matter. More particularly, it deals with a novel dielectric composition, a highly cyanoethylated material combining a major portion of cyanoethylated cellulose of a high degree of substitution and a minor portion of cyanoethylated polyvinyl alcohol. The invention also contemplates a novel method of preparing the novel composition.

Cellulose, both natural and regenerated, has been reacted with acrylonitrile in various ways to produce cyanoethylated derivatives. Physical properties of the resultant products vary with the nature of the cellulose, its molecular weight, the method of treatment and the like. However, it is effected most noticeably by the extent to which it has been cyanoethylated.

This latter usually is defined in one of two ways, either by a nitrogen analysis, expressed in weight percent, or by a decimal fraction representing the number of cyanoethyl groups introduced per anhydroglucose unit. This decimal fraction usually is referred to as the "degree of substitution." For purposes of simplification, in this discussion the latter will be abbreviated as DS. Both terminologies are used in this specification. Complete cyanoethylation corresponds to a nitrogen content of about 13.1 percent nitrogen and a DS of three.

At low degrees of substitution, i.e., a DS up to about two, cyanoethylation of cellulose does not greatly alter its physical appearance, the fibrous characteristics being largely retained. However, as higher DS values are produced, the characteristics of the product begin to change. As the DS increases above about two, the loss of fibrous characteristics and the resemblance of the product to a thermoplastic becomes increasingly noticeable. Moreover, the product begins to become soluble in certain organic solvents.

These characteristics begin to become dominant in products having a DS above about 2.3 which correspond approximately to nitrogen content percentages of from about 11.4 or 11.5 up to somewhat over 13. It is with products of this highly-cyanoethylated type with which the present invention is particularly concerned. Again for purposes of simplification, in this discussion such products will be referred to using the abbreviation "HCC." Such products, particularly those having a DS above about 2.5, have very desirable electrical characteristics for a number of purposes. Among these are a high dielectric constant and a relatively low dissipation factor.

This combination of properties has led to consideration of the possible application of HCC films, cast from solution, in the fabrication of electroluminescent devices. In essence, such a device is comprised of two electrodes, at least one of which transmits light, between which a prosphor is embedded in a suitable matrix. A requirement for the matrix is that it have a high dielectric constant [S. Roberts, J. Opt. Soc. Am. 42, 850 (1952)]. Among the dielectric matrices for electroluminescent phosphors that have been suggested are the ethers of cellulose, for example in U.S. Patents 2,774,004, 2,792,-447, 2,918,594 and 2,901,652. The latter in particular suggests cyanoethylated cellulose as a preferred material of high dielectric constant.

To be wholly satisfactory for such purposes, the matrix must have a dielectric constant of at least about nine, preferably from about eleven to about fourteen. To attain this value in HCC ordinarily requires a DS of about 2.5, or higher, corresponding to a nitrogen content of at least about 12.1 percent. It is also clear that the dissipation factor should be as low as possible since it represents waste of electrical energy into unwanted heat. The dissipation factor should be below about 0.028 and preferably below about 0.025. This, in turn, requires that the HCC, to be suitable for the purpose, must be free from ionic impurities to a high degree. Its content of such impurities should not exceed about not over 200 parts per million and preferably not more than about 50 p.p.m. In addition, such products should be substantially waterwhite.

Unfortunately, the proposed use of HCC of a grade which exhibits the combination of desired electrical properties and lack of color in electroluminescent devices has been hampered by several problems. Probably the most serious is the poor degree of adhesion of such HCC to the conductive coating on the electrode, such an electrode typically being glass or some equivalent transparent or translucent non-conductor having a conductive coating consisting of a tin oxide film (U.S. Patent 2,838,715) or its equivalent. In order to get good electrical contact, the minimum adhesion of the phosphor-containing matrix to the conductive coating on the glass must be sufficient to insure that the matrix film will not spontaneously peel from the conductive surface during the drying of the film which follows its casting in solution onto the electrode. While the desired quality grade of HCC exhibits adequate adhesion to the glass or its equivalent, it frequently gives unsatisfactory results when films are cast on the layer of tin oxide or its equivalent which comprises the electrode surface on the so-called "conductive glass."

Furthermore, the film obtainable using a suitable grade of HCC often is less strong than is desirable. While the weakness of the film is not as serious a drawback as its poor adhesion, it can be said that any improvement here, especially if not at the expense of the electrical properties, will also be desirable, particularly so in flexible electroluminescent panels such as shown in U.S. Patent 2,774,-004. Improved strength also is very important in capacitor applications where cyanoethylated cellulose finds utility by virtue of its high dielectric constant. Very thin films (less than 1 mil) are employed in capacitors and they must have adequate strength to survive handling during manufacture. Previous attempts to make capacitors of specific types have encountered some difficulties along this line.

It is, therefore, a principal object of the present invention to develop an HCC composition suitable for use for such dielectric purposes as the preparation of phosphor-bearing matrices and the like without being subject to the noted mechanical difficulties of poor adhesion and relatively low strength. This has been accomplished in relatively simple but surprisingly successful manner.

In general, the desired result is preferably accomplished by cyanoethylating a mixture containing from about forty to about ninety-nine percent cellulose and from about one to about sixty percent of polyvinyl alcohol. The latter, for purposes of simplification, is hereinafter noted by the abbreviation "PVA."

It is quite surprising that the inclusion of even as little as about one percent of cyanoethylated PVA in the final cyanoethylated composition is helpful in obtaining the desired result. Two percent produces a very marked improvement. Usually from about two to about fifty percent will be used to produce the desired result.

Cyanoethylated PVA, hereinafter referred to as "CPVA," is not a new product, being described for example by Lewis and Hogle in J. Polymer Sci., 21, 411

(1956), wherein the dielectric properties of highly cyanoethylated cellulose as well as of highly cyanoethylated polyvinyl alcohol are shown. These materials are both characterized by the fact that they possess unusually high dielectric constants and relatively low dissipation factors.

However, in order to adequately lower the latter, as was discussed above, it is necessary to remove substantially all ionic impurities from the product. This is particularly difficult with CPVA. The latter tends to occlude these impurities. For this reason in the past CPVA has not been considered as a potentially satisfactory product for commercial development of electroluminescent devices, capacitors and the like. It is quite unexpected, therefore, to find that it can be combined with cellulose in accordance with the present invention to obtain a cyanoethylated product mixture which is highly suitable for the intended purposes.

PVA for use in the composition of the present invention may be obtained from any suitable source. However, it should meet the following general limitations. It should be as fully hydrolyzed, i.e., as free from the ester groupings present during the process of manufacture as can be practically obtained. A number of commercially-available products meet this requirement. As to the degree of polymerization, this can be most simply specified in terms of its viscosity. For example, a four percent aqueous solution of suitable material should at 20° C. have a viscosity of from about twenty to about one hundred centipoises. This and equivalent material expressed in other terms are readily available and may be used.

In general, in the product compositions of the present invention, CPVA will be present in amounts of from about one to about fifty percent. Ordinarily, however, this range may be narrowed to from about two to about thirty percent. In general, use of the minimum effective amount for a particular case is preferable. This aids in minimizing the ionic content of the final product. As noted above, it is more difficult to obtain CPVA having an electrolyte content as low as can be obtained in HCC. However, according to the present invention, it has been found that using commercially-available grades of PVA, the inclusion of the desired amount of CPVA to obtain the desired adhesion and strength properties in the final product can be accomplished without unduly increasing the final total electrolyte content.

Cellulose suitable for use according to the present invention may be a natural cellulose fiber or one of the available forms of regenerated cellulose. Several forms of both are commercially-available, as for example cotton linters, viscose rayon and the like. Within reasonable limits any of such available products may be used. Wherever it is available, regenerated cellulose is perhaps preferable because it can be obtained in fibers of uniform size. This simplifies some of the mechanical handling problems.

Neither CPVA nor HCC are new per se with the present invention. In accordance therewith, they may be prepared in any known manner. One such is shown for example in U.S. Patent 2,332,049. In general, such procedures involve reacting the cellulose or PVA with acrylonitrile in the presence of alkali, then precipitating and washing or otherwise isolating the cyanoethylated product. It is not necessarily simple to produce HCC of the necessary low ionic material content. The latter must be washed out in the latter stages of preparation. It is even more difficult, as noted above, to do so in CPVA which because of its rubbery nature tends to occlude these impurities. To reduce the impurities content to the low level of the HCC is possible with sufficient washing but the concomitant losses are excessive and make the procedure economically impractical when carried to such an extent.

In general, the compositions of the present invention contemplate compositions of HCC and CPVA, however prepared. For example, HCC and CPVA may be separately prepared, purified and then admixed in the desired proportions. This is perhaps the least desirable method because the dissipation factor of the resultant CPVA, which is almost inevitably higher than that of resultant HCC, after such mixing may result in the dissipation factor of the final product mixture exceeding that which is desired. For compositions containing small percentages of CPVA, however, this procedure is often entirely practical.

A somewhat better procedure is first to conduct the cyanoethylation of the cellulose and the PVA as separate operations; then, before precipitation and washing, the requisite amounts of each reacted mixture to give the desired final product are combined. Thereafter they are conjointly precipitated and washed. It is found this type of operation makes it easier to obtain the desired combination of electrical properties. Moreover, as compared with separately making, purifying and mixing the two ingredients, it permits higher CPVA contents with less danger of too high a dissipation factor.

In general, however, the preferred procedure is to admix the cellulose and PVA in the desired proportions. Thereafter, they are conjointly cyanoethylated then conjointly precipitated and washed exactly as in treating cellulose by itself by known methods. It is not certain what mechanism produces the effect which is obtained in this conjoint cyanoethylating, precipitating and purifying operation but the product is superior to the same composition obtained in any other way presently known. This procedure also makes it readily practicable to produce HCC-CPVA compositions containing as high as about sixty percent CPVA of suitable electrical properties. Compositions containing such high CPVA contents, however, tend to be too soft and tacky for most purposes. Above fifty percent CPVA will seldom be encountered.

In either of the later two methods of preparing the final compositions, the CPVA content can be much higher than is necessary to obtain the desired improved adhesive and tensile strength properties. This is a definite commercial advantage. It permits, in effect, CPVA "concentrates" in HCC which may be diluted at will by the user by admixture with HCC from a different source.

The invention will be more fully discussed in conjunction with the following illustrative examples. The latter show the method of operation as well as the products. Therein, unless otherwise noted, all parts and percentages are by weight and all temperatures are expressed in degrees centigrade.

EXAMPLE 1

To a suspension of 120 g. of regenerated cellulose in 3 liters of acrylonitrile held at 50° C., is added dropwise over a five minute period an aqueous solution of 6.0 g. of sodium hydroxide. The total water content on the reaction mixture amounts to 120 g. Agitation is continued at 50° C. for 4 hours at which time the mixture is neutralized with acetic acid. The cyanoethylated cellulose has completely dissolved in the excess acrylonitrile during this period. The resultant solution is filtered under pressure and then added dropwise to a stirred vessel containing boiling water. Acrylonitrile is thereby steam-distilled causing the cyanoethylated cellulose to precipitate as a white, fibrous solid. The product is washed repeatedly with water and then dried. Analysis shows a nitrogen content of 12.6%.

EXAMPLE 2

To a cold mixture of 1.5 liters of acrylonitrile and 50 g. of 6% aqueous sodium hydroxide is added slowly while stirring 55 g. of PVA. The temperature is then raised to 50° C. and maintained there for two hours. At the end of this period, the PVA has dissolved in the acrylonitrile and the mixture is neutralized using acetic acid. It is then filtered and the filtrate aded dropwise to a flask equipped with an agitator and containing 1.5 liters of boiling water. The product precipitates as a yellowish, sticky mass which is very difficult to handle. It is redissolved in acetonitrile and reprecipitated by the use of methanol. The methanol is decanted and the precipitate washed repeatedly with deionized water in a Waring Blendor. The product after drying at 130° is CPVA having a nitrogen content of 12.1%. Handling losses during purification are extensive. The dried product is quite tacky.

EXAMPLE 3

EXAMPLE 4

The procedure of Example 1 is repeated except that the charge consists of 117.6 g. of cellulose and 2.4 g. of PV. The reaction proceeds in exactly the same fashion as in Example 1 and no difference is observed in either the rate of reaction, the ease of purification or the appearance of the product.

The procedure of Example 1 is repeated except the charge coinsists of 114.3 g. of cellulose and 5.7 g. of PVA. This mixture also behaves in all respects like cellulose during reaction, purification and in appearance of the product.

EXAMPLE 5

The procedure of Example 1 is repeated using a mixture comprising 36 g. of PVA and 84 g. of cellulose. An excellent film is obtained in the procedure of Example 7 (below).

EXAMPLE 6

The procedure of Example 1 is repeated using 72 g. of PVA and about 48 g. of cellulose. The resultant film is quite tacky. Its electrical and physical properties were not tested.

EXAMPLE 7

Solutions having 10% dissolved solids are made up from the products of the previous examples using acetonitrile as solvent. These solutions are cast on lead foil and allowed to dry first at 40° C. overnight, then for 1 hour at 130°, and finally for 24 hours under high vacuum at room temperature, giving films having a thickness of 2 mils. The electrical properties were then measured at 25° and 60 cycles per second, with the lead foil being used as one of the electrodes.

The results obtained in the preceding Examples 1 to 5 are summarized in the following table.

*Table I*

| Product from Example | Dielectric Constant | Dissipation Factor |
| --- | --- | --- |
| 1 | 11.9 | 0.013 |
| 2 | 12.6 | 0.043 |
| 3 | 11.5 | 0.018 |
| 4 | 11.5 | 0.017 |
| 1 and 2 [1] | 10.6 | 0.020 |
| 5 | 14.4 | 0.024 |

[1] A mixture consisting of 9 parts of product of Example 1 and 1 part of product of Example 2.

Several conclusions may be noted from Table I. For example, there is little significant difference in dielectric properties among the products of Examples 1, 3 and 4. The values found are within the range of general commercial reproducibility. The product of Example 2 has a decidedly higher dissipation factor reflecting, it is believed, a higher electrolyte content despite the more extensive purification and washing to which it was subjected. The mixture of the products of Examples 1 and 2 has acceptable properties but the values are probably significantly less desirable than the products of Examples 1, 3 and 4. The product of Example 5 has an exceptionally high dielectric constant. However, being high in CPVA its dissipation factor is somewhat lower than the products of Examples 1, 3 and 4.

EXAMPLE 8

Additional films of cyanoethylated cellulose and of mixtures of HCC and of CPVA are cast by the procedure of Example 5 on the conductive surface of a "conductive glass" sheet. This surface comprised essentially tin oxide and a resistance of 100 ohms per square. (Such glass is described in "Materials and Methods," August 1956.) The dried films are conditioned at 23° C. and 50% relative humidity and the strength of the adhesive bond of the cyanoethylated product to the conductive glass is measured by peeling off one-inch wide films at an angle of 180° C. using a commercially-available Instrom instrument. Results are shown in Table II.

*Table II*

| Product from Example— | Adhesion, grams/in. width |
| --- | --- |
| 1 | 2.5 |
| 3 | 5.1 |
| 4 | 11.0 |

A significant improvement by the presence of the CPVA is thus observed. The adhesion of the product of Example 1 is so unsatisfactory that the film frequently peels off during drying. This is especially true if the initial drying rate is increased by the use of a higher drying temperature.

EXAMPLE 9

Additional films were prepared as in Example 8, except that they were cast on plate glass after drying and were freed from the latter using warm water. The films again were dried, conditioned at 23° C. and 50% relative humidity and pieces measuring 10″ x ½″ were tested for physical strength. Results are shown below in Table III.

*TABLE III*

| Product from Example | Tensile Strenght, p.s.i. | Elongation, Percent |
| --- | --- | --- |
| 1 | 5,380 | 9.0 |
| 3 | 6,710 | 5.8 |
| 4 | 6,400 | 4.2 |

A significant improvement of 25% and 19%, respectively, in tensile strength for products 3 and 4 is to be observed. In the preceding discussion, the use of acetonitrile as a solvent is to be noted. This does not form part of the present invention. It does form a part of the subject matter of the application for U.S. Letters Patent, Serial No. 67,457, filed of even date by N. M. Bikales, one of the present inventors, together with K. W. Saunders.

We claim:

1. A composition of matter consisting essentially of cyanoethylated cellulose and from about one to about sixty weight percent of the total composition of cyanoethylated polyvinyl alcohol, said cyanoethylated cellulose constituting substantially the entire remainder, each of said cyanoethylated substituents having a nitrogen content of at least about 11.4 weight percent and said composition being further characterized by a dielectric constant not less than about nine and a dissipation factor not more than 0.028.

2. A composition according to claim 1 in which each of said cyanoethylated substituents has a nitrogen content of at least about 12.5 weight percent.

3. A composition according to claim 1 in which said composition has a dielectric constant of at least eleven.

4. A composition according to claim 1 having a dissolved electrolyte content of less than about 200 parts per million.

5. A composition according to claim 1 having a dissolved electrolyte content of less than about 50 parts per million.

6. A composition according to claim 1 in which said cyanoethylated polyvinyl alcohol content is from about two to about fifty weight percent.

7. The method of preparing a composition of matter having a dielectric constant of at least nine and a dissipation factor less than 0.0275 which comprises; in aqueous media, separately reacting each of polyvinyl alcohol and cellulose with an excess amount of acrylonitrile in the presence of an alkali metal hydroxide until each is cyanoethylated to a nitrogen content of at least about 11.4 weight percent and the cyanoethylated product is dissolved in said excess acrylonitrile; combining a sufficient amount of resultant cyanoethylated polyvinyl alcohol solution to provide from about one to about sixty parts by weight of cyanoethylated polyvinyl alcohol with a sufficient amount of said resultant cyanoethylated cellulose solution to provide a combined total of about one hundred parts of cyanoethylated materials; conjointly precipitating said cyanoethylated materials; washing the resultant precipitated material to a residual electrolyte content of less than 200 parts per million and collecting the washed product.

8. The method of preparing a composition of matter having a dielectric constant of at least nine and a dissipation factor less than 0.0275 which comprises; combining from about one to about sixty parts by weight of polyvinyl alcohol with a sufficient amount of cellulose to provide a total of about one hundred parts by weight; reacting resultant mixture with excess acrylonitrile in the presence of an alkali metal hydroxide until the reacted material has an average nitrogen content of at least 11.4 weight percent; neutralizing the resultant solution; conjointly precipitating the cyanoethylated material, washing the resultant precipitated material to a residual electrolyte content of less than 200 parts per million and collecting the washed product.

References Cited in the file of this patent

UNITED STATES PATENTS 2,918,594     Fridrich _____ Dec. 22, 1959
2,951,865     Jaffe et al. _____ Sept. 6, 1960

OTHER REFERENCES

Lewis et al.: The Rotation of Polar Groups in High Polymers, Jour. of Polymer Science, vol. 21, 1956, pp. 411–416.